Patented Dec. 15, 1953

2,662,909

UNITED STATES PATENT OFFICE 2,662,909

AMINOSILOXANES

Leo H. Sommer, State College, Pa., assignor to Dow Corning Corporation, Midland, Mich., a corporation of Michigan No Drawing. Application December 13, 1951, Serial No. 261,596

7 Claims. (Cl. 260—448.2)

This invention relates to siloxanes having an amino group in the molecule.

It is an object of the invention to prepare new polymeric siloxanes having amino functional groups in the polymer chains. Another object is to prepare polymers which may be further reacted with cross-linking agents such as dicarboxylic acids to form resinous material.

In this application Me designates the methyl radical.

This invention relates to polysiloxanes in which the unit formula is $[SiMe_2(CH_2)_nCHNH_2(CH_2)_nSiMe_2O]$ where $n$ has a value from 2 to 5 inclusive.

The above polymers are prepared by reacting aminosilanes of the formula $[R'Me_2Si(CH_2)_n]_2CHNH_2$ where R is a methyl or phenyl radical and $n$ is as above defined, with concentrated sulfuric acid followed by hydrolysis of the resulting sulfate with water. The reactions involved are cleavage of the R' group from the silicon by the sulfuric acid to give a silyl sulfate and methane or benzene depending upon whether the R' group is methyl or phenyl, respectively. The sulfate group is then removed from the silicon by hydrolysis whereupon a silanol is formed which condenses to a polysiloxane.

The above described siloxanes may be either homopolymeric or copolymeric in nature. Homopolymers, (i. e. those in which all units are the same) are obtained by treating a single aminosilane with sulfuric acid and thereafter hydrolyzing the product. Copolymers may be obtained by treating a mixture of two or more of the above defined amines with sulfuric acid followed by hydrolysis. For example, one may prepare a copolymer by treating a mixture of one of the above amines in which $n$ is 2 and one of the amines in which $n$ is 4. The resulting copolymer will then be composed of both types of units.

In addition, copolymers may be prepared by interacting the siloxanes of this invention with conventional siloxanes of the formula $R_xSiO_{\frac{4-x}{2}}$ where R is any monovalent hydrocarbon radical free of aliphatic unsaturation and $x$ has a value from 1 to 3, inclusive. These copolymers are obtained by interacting one or more of the above aminosiloxanes with one or more of the defined conventional siloxanes. This interaction is best carried out in the presence of a catalyst such as alkali metal hydroxides, salts of carboxylic acids, and alkali metal salts of silanols. The conditions for copolymerization are thus similar with those employed in the copolymerization of conventional siloxanes. These methods are well known.

Conventional siloxanes which may be copolymerized with those of this invention may be either monoorganosiloxanes such as phenylsilicic acid, phenylsilsesquioxane, methylsilsesquioxane and butylsilicic acid; or diorganosiloxanes such as dimethylsiloxane, phenylmethylsiloxane, ditolylsiloxane, stearylmethylsiloxane, and naphthylmethylsiloxane; or triorganosiloxanes such as hexamethyldisiloxane, hexaphenyldisiloxane, and tetraamyldiphenyldisiloxane.

In order for the aminosiloxanes of this invention to have any appreciable effect on the copolymers, they should be present in amount of at least .001 mol per cent.

The aminosiloxanes of this invention exhibit other standard behavior common to conventional siloxanes in that they may be depolymerized by heating at temperatures above 350° C. under reduced pressure. Under such conditions cyclic materials are obtained. The rearrangement may be carried out at lower temperatures such as 250° C. if catalysts such as alkali metal hydroxides are employed. A typical cyclic obtained by the above method is the dimeric siloxane having the formula $[Me_2Si(CH_2)_2CHNH_2(CH_2)_2SiMe_2O]_2$ The aminosilanes of the formula $[R'Me_2Si(CH_2)_n]_2CHNH_2$ from which the aminosiloxanes of this invention are prepared are described and claimed in the applicant's copending application Serial Number 261,601 entitled "Bis-Triorganosilylamines," filed concurrently herewith, and now Patent Number 2,634,283.

The materials of this invention are useful as additives for conventional siloxanes. They are also useful as intermediates in the preparation of resinous materials in which cross-linkage may be brought about by reacting the amino groups along the chain with polycarboxylic acids.

The following examples are illustrative only and are not to be construed as limiting the invention which is properly set forth in the appended claims.

Example 1

40 grams of 2,2,8-tetramethyl-2,8-disila-5-aminononane $[Me_3Si(CH_2)_2]CHNH_2$ was added with stirring and cooling in an ice water bath to 68 ml. of concentrated sulfuric acid. Gas evolution occurred throughout addition of the amine. The reaction mixture was then stirred at room temperature for 24 hours and finally heated on a hot plate for ½ hour. By this time all frothing had ceased. The reaction mixture was then poured onto cracked ice and the mixture was made strongly alkaline with concentrated KOH solution. It was extracted with four 250 ml. portions of ether and the ether extracts were combined and dried over anhydrous sodium sulfate. The ether was distilled and there remained 39 grams of a very viscous, sticky polymeric material in which the polymer units were of the formula

[Me$_2$Si(CH$_2$)$_2$CHNH$_2$(CH$_2$)$_2$SiMe$_2$O—]

Example 2

The polymer of Example 1 was dissolved in 200 ml. of isopropanol and there was added thereto a solution of 40 grams of KOH in 35 ml. of water and 310 grams of hexamethyldisiloxane. The mixture was stirred at 78° C. for 22 hours. The mixture was cooled, washed three times with 150 ml. portions of a saturated ammonium chloride solution and finally dried over anhydrous K$_2$CO$_3$. The excess hexamethyldisiloxane and remaining isopropanol were distilled and the residual material was fractionated at reduced pressure. There was isolated the copolymer Me$_3$SiOSi(CH$_2$)$_2$CHNH$_2$(CH$_2$)$_2$SiOSiMe$_3$ with Me groups on each Si boiling at 98° C. at 2 mm. pressure and having the following properties: molar refraction 112.75, $N_D^{20}$ 1.4282, $d^{20}$ 0.8654. The material was found to contain 30 per cent silicon.

The residue was a very viscous high molecular weight copolymer which was a mixture of materials of the general formula Me$_3$SiO[Si(CH$_2$)$_2$CHNH$_2$(CH$_2$)$_2$SiO]$_n$SiMe$_3$ with Me groups where $n$ has a value above 1.

Example 3

When the amines shown below are treated with concentrated H$_2$SO$_4$ and the resulting product thereafter hydrolyzed, as shown in Example 1, siloxane polymers in which the polymer units are those shown below are obtained. In each case the polymers are viscous materials composed of molecules of varying molecular weight.

| Amine | Unit formula of polymer produced |
|---|---|
| [Me$_3$Si(CH$_2$)$_3$]$_2$CHNH$_2$ | [Me$_2$Si(CH$_2$)$_3$CHNH$_2$(CH$_2$)$_3$SiMe$_2$O] |
| [Me$_3$Si(CH$_2$)$_4$]$_2$CHNH$_2$ | [Me$_2$Si(CH$_2$)$_4$CHNH$_2$(CH$_2$)$_4$SiMe$_2$O] |
| [C$_6$H$_5$Me$_2$Si(CH$_2$)$_5$]$_2$CHNH$_2$ | [Me$_2$Si(CH$_2$)$_5$CHNH$_2$(CH$_2$)$_5$SiMe$_2$O] |

Example 4

When 0.1 gram mols of a siloxane having the unit formula

[Me$_2$Si(CH$_2$)$_3$CHNH$_2$(CH$_2$)$_3$SiMe$_2$O]

is copolymerized with 0.9 gram mols of phenylmethylsiloxane by the method shown in Example 2, a liquid copolymer composed of 10 mol per cent of the former siloxane units and 90 mol per cent of the latter siloxane units is obtained.

Example 5

When .1 gram mols of a siloxane having the unit formula

[Me$_2$Si(CH$_2$)$_4$CHNH$_2$(CH$_2$)$_4$SiMe$_2$O]

.1 gram mol of a siloxane having the unit formula [Me$_2$Si(CH$_2$)$_5$CHNH$_2$(CH$_2$)$_5$SiMe$_2$O], .3 gram mols of phenylsilicic acid, .3 gram mols of methylsilicic acid and .2 gram mols of stearylmethylsiloxane are copolymerized in accordance with the method shown in Example 2, a resinous copolymeric siloxane containing each of the above defined units is obtained.

That which is claimed is:

1. A siloxane in which the polymer units are of the formula $$[-\underset{\text{Me}}{\overset{\text{Me}}{\text{Si}}}(CH_2)_n CHNH_2 (CH_2)_n \underset{\text{Me}}{\overset{\text{Me}}{\text{Si}}}-O-]$$

in which $n$ has a value from 2 to 5 inclusive and in said siloxane all polymer units being bonded one to another by Si—O—Si linkages.

2. A siloxane in accordance with claim 1 in which $n$ is 2.

3. A siloxane in accordance with claim 1 in which $n$ is 3.

4. A siloxane in accordance with claim 1 in which $n$ is 4.

5. A siloxane in accordance with claim 1 in which $n$ is 5.

6.

Me$_3$SiOSi(CH$_2$)$_2$CHNH$_2$(CH$_2$)$_2$SiOSiMe$_3$ with Me groups on each Si.

7. A polysiloxane consisting of $$[-\underset{\text{Me}}{\overset{\text{Me}}{\text{Si}}}-(CH_2)_n CHNH_2 (CH_2)_n -\underset{\text{Me}}{\overset{\text{Me}}{\text{Si}}}-O-]$$

polymer units where $n$ has a value of 2 to 5 inclusive, and up to .999 mol per cent polymer units having the general formula $$R_x SiO_{\frac{4-x}{2}}$$

where R is a monovalent hydrocarbon radical free of aliphatic unsaturation, and $x$ has a value of from 1 to 3 inclusive, and in said polysiloxane all polymer units being bonded one to another by Si—O—Si linkages.

LEO H. SOMMER.

References Cited in the file of this patent
UNITED STATES PATENTS

| Number | Name | Date |
|---|---|---|
| 2,567,131 | Speier | Sept. 4, 1951 |

OTHER REFERENCES

Sommer et al., Journ. Amer. Chem. Soc., vol. 73, 1951, page 882.